United States Patent
Matayoshi

Patent Number: 5,682,850
Date of Patent: Nov. 4, 1997

[54] ENGINE CYLINDER HEAD

[75] Inventor: Yutaka Matayoshi, Yokosuka, Japan

[73] Assignee: Nissan Motor Co., Ltd., Kanagawa, Japan

[21] Appl. No.: 736,754

[22] Filed: Oct. 25, 1996

[30] Foreign Application Priority Data

Oct. 26, 1995 [JP] Japan ..................... 7-279238

[51] Int. Cl.$^6$ .................................. F02B 17/00
[52] U.S. Cl. ...................................... 123/193.5
[58] Field of Search ..................... 123/193.5, 193.1; 29/888.06, 888.061

[56] References Cited

U.S. PATENT DOCUMENTS

| | | | |
|---|---|---|---|
| 4,567,860 | 2/1986 | Sugiyama | 123/193.5 |
| 4,658,763 | 4/1987 | Gobien et al. | 123/193.5 |
| 5,207,210 | 5/1993 | Yamagata et al. | 123/193.5 |
| 5,551,393 | 9/1996 | Amano et al. | 123/193.5 |

FOREIGN PATENT DOCUMENTS 6-207542  7/1994  Japan.

*Primary Examiner*—Marguerite McMahon
*Attorney, Agent, or Firm*—Lowe, Price, LeBlanc & Becker

[57] ABSTRACT

In a cylinder head for a multi-cylinder engine, which is manufactured by a casting process and which has two intake ports and two exhaust ports for each cylinder, the formation of a coolant conduit is facilitated. During the manufacture by casting, a coolant conduit is formed using a sand core so as to avoid the undersides of the intake ports. Further, a concave portion which opens to the under surface of the cylinder head is provided underneath a pair of the intake ports. And a connecting hole is formed in the cylinder head by a mechanical process so as to communicate the coolant conduit with the concave portion. In the case of a prior art type engine in which a fuel injector or the like is provided under the intake ports and the portion of the coolant conduit which passes under the intake ports is formed by using a sand core, , the sand core for this portion is easily damaged from the constructional point of view. However, according to the above described construction, it is possible to provide a coolant conduit which passes underneath the intake ports without using any sand core for the formation thereof.

8 Claims, 9 Drawing Sheets

FIG. I

ENGINE CYLINDER HEAD

FIELD OF THE INVENTION

This invention relates to a cooling conduit configuration for a cylinder head of an engine which is provided with a fuel injector which injects fuel directly into a cylinder.

BACKGROUND OF THE INVENTION

A construction for an engine in which a fuel injector is provided so as to inject fuel directly into a cylinder, and in which the injected fuel is ignited by a spark produced by a spark plug, is disclosed for example in Tokkai Hei 6-207542 published by the Japanese Patent Office in 1994.

In this construction, as shown in FIG. 8, a recess 11 is formed in the crown surface 10a of a piston 10. When this engine is being started, from the commencement of cranking until the engine revolution speed has risen up to a predetermined value, the fuel is injected twice in each engine cycle, in the last stage of each compression stroke and also in the last stage of each exhaust stroke; while, after the engine revolution speed has reached and risen above this predetermined value, the fuel is injected only in the last stage of each compression stroke.

With this engine, the fuel injector 13 is fitted slantingly in the cylinder head 14 between its lower surface and the intake port 14, and the spray of injected fuel is concentrated downwards of the central axis of the fuel injector 13, so as to enter into the recess 11.

Generally, as shown in FIGS. 9 and 10, a coolant conduit which is formed in the cylinder head surrounds the combustion chambers 20; and moreover, not only do portions of this coolant conduit pass under the bottom surfaces of the intake ports 14 and the exhaust ports 18, but, if the fuel injectors 13 are arranged as described above, the coolant conduit 16d passes even under the fuel injectors 13.

For this reason, there is the problem with the engine described above that it is difficult to maintain the cross sectional dimensions of this coolant conduit 16d.

Further, when the cylinder head is being manufactured by casting, the coolant conduit 16d is formed by placing a sand core 40 shaped as shown in FIG. 11 in the casting mold in advance. The sand core 40 is required to be formed with apertures 40b, 40c, and 40d in order respectively to define head bolt apertures, valve apertures, and spark plug apertures in the cylinder head. Special cores are inserted in these apertures, so that hollow cylindrical portions with walls of a predetermined thickness are formed by the molten material for the cylinder head flowing into the gaps between the wall surfaces of these apertures and these cores.

When the coolant conduit 16d is defined by such a sand core 40, it is necessary to provide the sand core 40 with conduit portions 40a which correspond to the portions of the coolant conduit 16d which pass under the intake ports 14. However, as will be understood from FIG. 11, these conduit portions 40a, due to their structure, are the portions of the sand core 40 which are the most delicate from the constructional point of view. Due to this, there is a tendency for these portions to be easily damaged due to the impetus of the molten material as it flows into the casting mold, and due to vibration which may occur while conveying the core and the like.

However, if these portions of the coolant conduit 16d are omitted, then the effectiveness of the engine cooling is reduced, and, since this entails a tendency to deterioration of the anti-knocking characteristics and of engine power output, it is in fact almost mandatory to provide these portions of the coolant conduit 16d below the undersides of the intake ports 14.

SUMMARY OF THE INVENTION

It is therefore an object of this invention to improve the manufacture of the coolant conduit in a cylinder head so as to eliminate the aforesaid weakest portion of the sand core.

It is a further object of this invention to provide an easier method for forming the coolant conduit in the cylinder head.

It is a still further object of this invention to reduce the time and the cost required for manufacture of the cylinder head.

In order to achieve the above objects, this invention provides a cylinder head for a multi-cylinder engine which is manufactured by a casting process and which comprises two intake ports and two exhaust ports for each cylinder. The cylinder head further comprises a coolant conduit which is formed in the cylinder head using a sand core, this coolant conduit being formed so as to avoid the undersides of the intake ports, a concave portion which is formed in the cylinder head underneath a pair of the intake ports, this concave portion opening to the under surface of the cylinder head, and a connecting hole which is formed in the cylinder head by a mechanical process so as to communicate the coolant conduit with the concave portion.

This cylinder head is specifically suitable for an engine which comprises a spark plug disposed generally at the center portion of the cylinder which corresponds to the pair of intake ports, and a fuel injector disposed underneath the pair of intake ports.

In such an engine, it is further preferable that the cylinder head further comprises a hole for receiving the fuel injector, and that the concave portion is formed so that the thicknesses of the walls between the concave portion, and the pair of intake ports and the fuel injector hole, are approximately uniform.

The cylinder head is also suitable for an engine which comprises a fuel injector disposed generally at the center portion of the cylinder which corresponds to the pair of intake ports, and a spark plug disposed underneath the pair of intake ports.

In such an engine, it is further preferable that the cylinder head further comprises a hole for receiving the spark plug, and that the concave portion is formed so that the thicknesses of the walls between the concave portion, and the pair of intake ports and the spark plug hole, are approximately uniform.

It is also preferable that the concave portion is formed by a mechanical process.

It is also preferable that the concave portion is formed during the manufacture by casting of the cylinder head by providing a convex portion at a portion of a casting mold which corresponds to the under surface of the cylinder head.

It is also preferable that a portion of the coolant conduit and a portion of the concave portion are overlapped in the vertical direction, and that the connecting hole is formed extending in the vertical direction so as to communicate the overlapped portions.

The details as well as other features and advantages of this invention are set forth in the remainder of the specification and are shown in the accompanying drawings.

DESCRIPTION OF THE PREFERRED EMBODIMENTS

Figure 1:
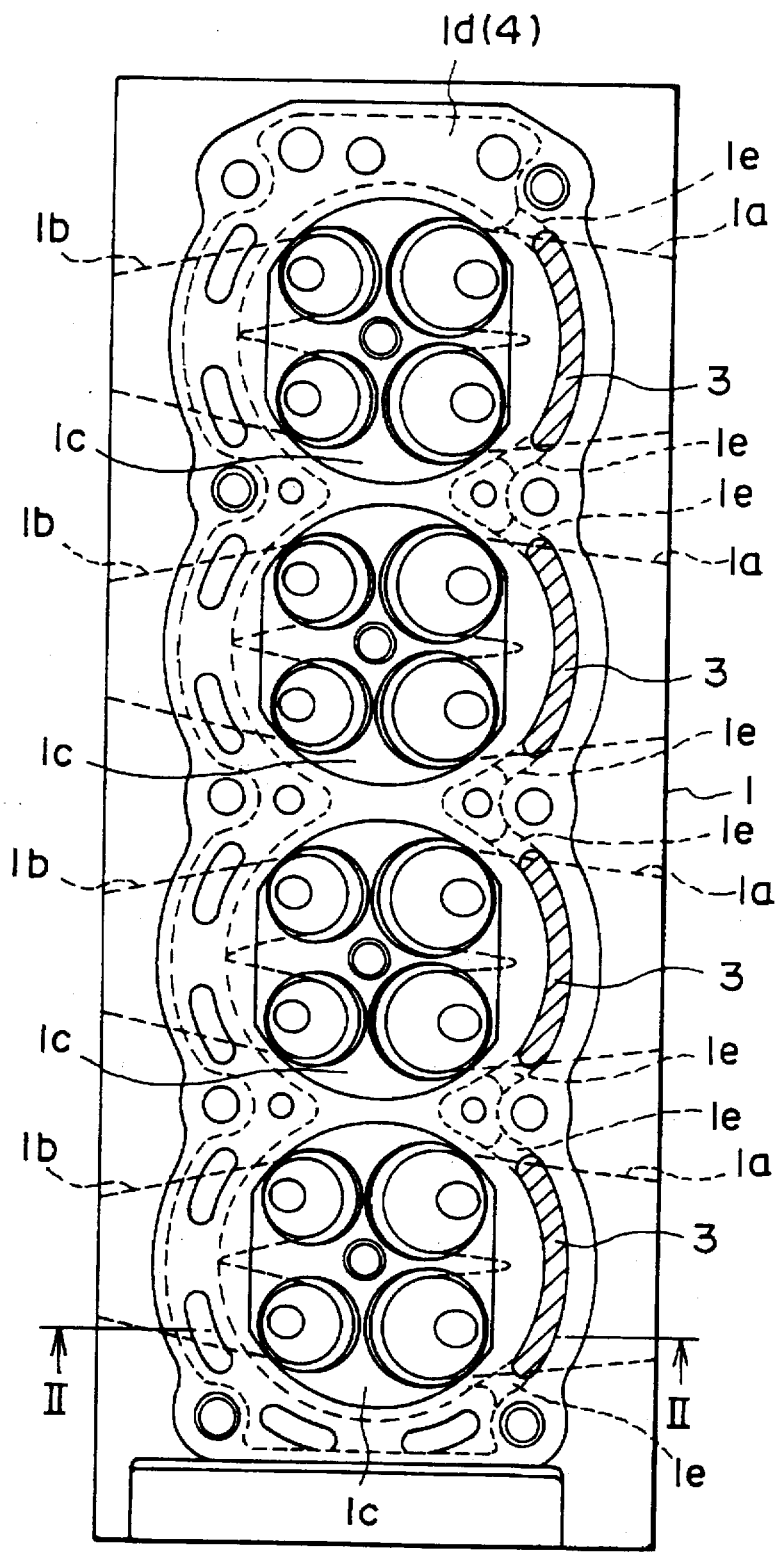
FIG. 1 is a plan view as seen from underneath of the bottom surface of a cylinder head according to the first embodiment of this invention.

Referring to FIG. 1 of the drawings, a cylinder head 1 for a direct injection type multi-cylinder engine comprises, for each cylinder, two intake ports 1a, two exhaust ports 1b, and a single combustion chamber 1c.

Figure 2:
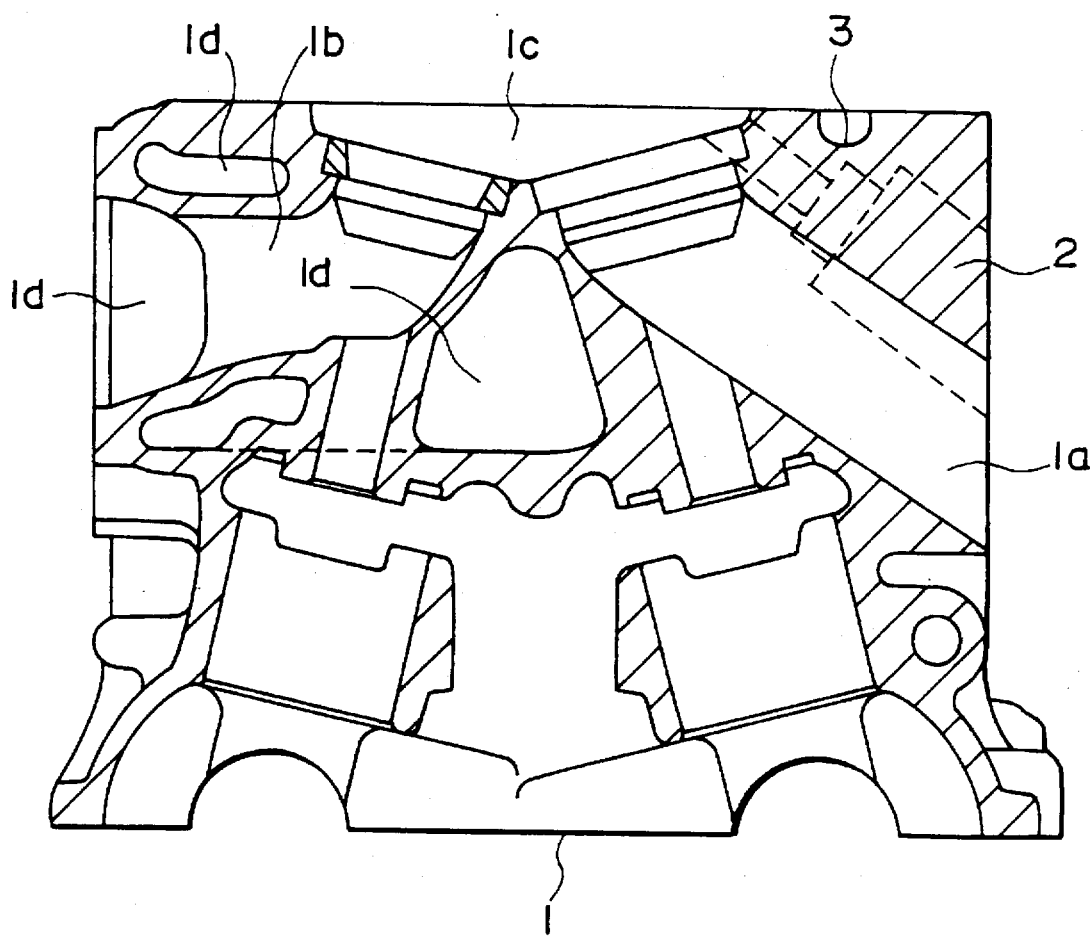
FIG. 2 is a cross-sectional view of the cylinder head taken along a line II—II in FIG. 1.

A coolant conduit 1d is formed in the cylinder head 1 so as to surround these intake ports 1a and exhaust ports 1b. As shown in FIG. 2, a hole portion 2 for receiving a single fuel injector is formed at a sloping orientation under each pair of neighboring intake ports 1a.

Further, a concave portion 3 which opens facing downwards is formed in a region which is located below these intake ports 1a.

Figure 3:
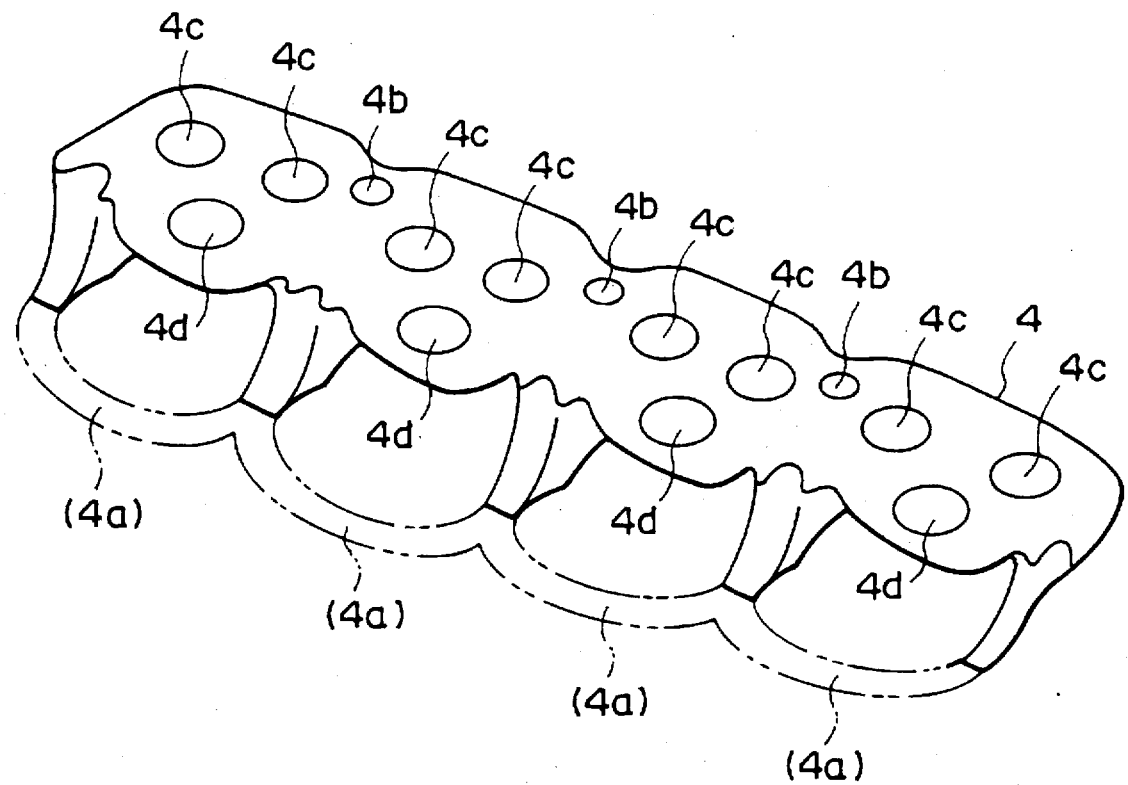
FIG. 3 is a perspective view of a sand core which is used in the manufacture of the cylinder head.
Figure 11:
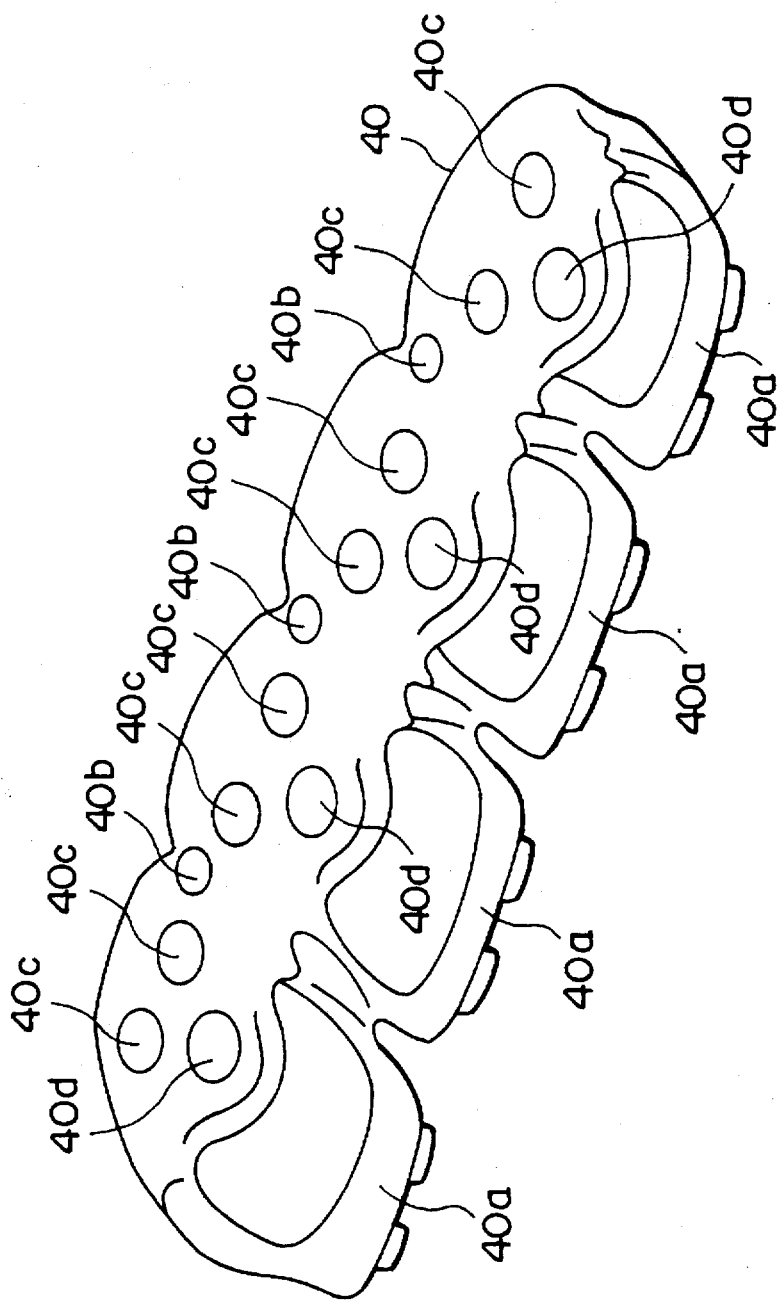
FIG. 11 is a perspective view of a sand core which is used in the manufacture of the cylinder head in FIG. 9.

The coolant conduit 1d is formed using a sand core 4 shown in FIG. 3. This sand core 4, just like the sand core 40 of the prior art shown in FIG. 11 and described above, comprises apertures 4b, 4c, and 4d for forming holes for head bolts, exhaust valves, and spark plugs; but does not have any portions which correspond to the conduit portions 40a which were present in that prior art. Instead of these, the above described concave portions 3 and the portions of the coolant conduit neighboring them are connected together by connecting conduits 1e (see FIG. 1). These connecting conduits 1e may be formed by a piercing tool such as a drill, after the cylinder head has been cast. When during assembly of the engine the under surface of the cylinder head 1 is fitted to a cylinder block, the open lower sides of the concave portions 3 are closed off by the upper surface of the cylinder block.

By connecting the concave portions 3 to the coolant conduit 1d via the connecting conduits 1e in this manner, they themselves constitute portions of the coolant conduit 1d. Accordingly, even though no portions such as the conduit portions 40a of the prior art, which were weak from the constructional point of view, are provided, nevertheless it is easily possible to form the portions of the coolant conduit 1d which pass underneath the intake ports 1a to be of sufficient cross sectional area. Further, since there is no requirement to form the sand core 4 with any portions like the conduit portions 40a of the prior art, accordingly there is no danger of damage being caused to such conduit portions by the impetus of the inflow of molten material during the process of manufacture by casting of the cylinder head, and there is no danger that such conduit portions might be damaged by vibration during transportation of the sand core. As a result the level of failure during the casting process is ameliorated, and accordingly the manufacturing cost for the cylinder head 1 is reduced.

Moreover, it is possible to form the concave portions 3 using a core of type different from the sand core 4; or it is possible to form them in the cylinder head by machining or some such mechanical process, rather than during casting.

Figure 4:
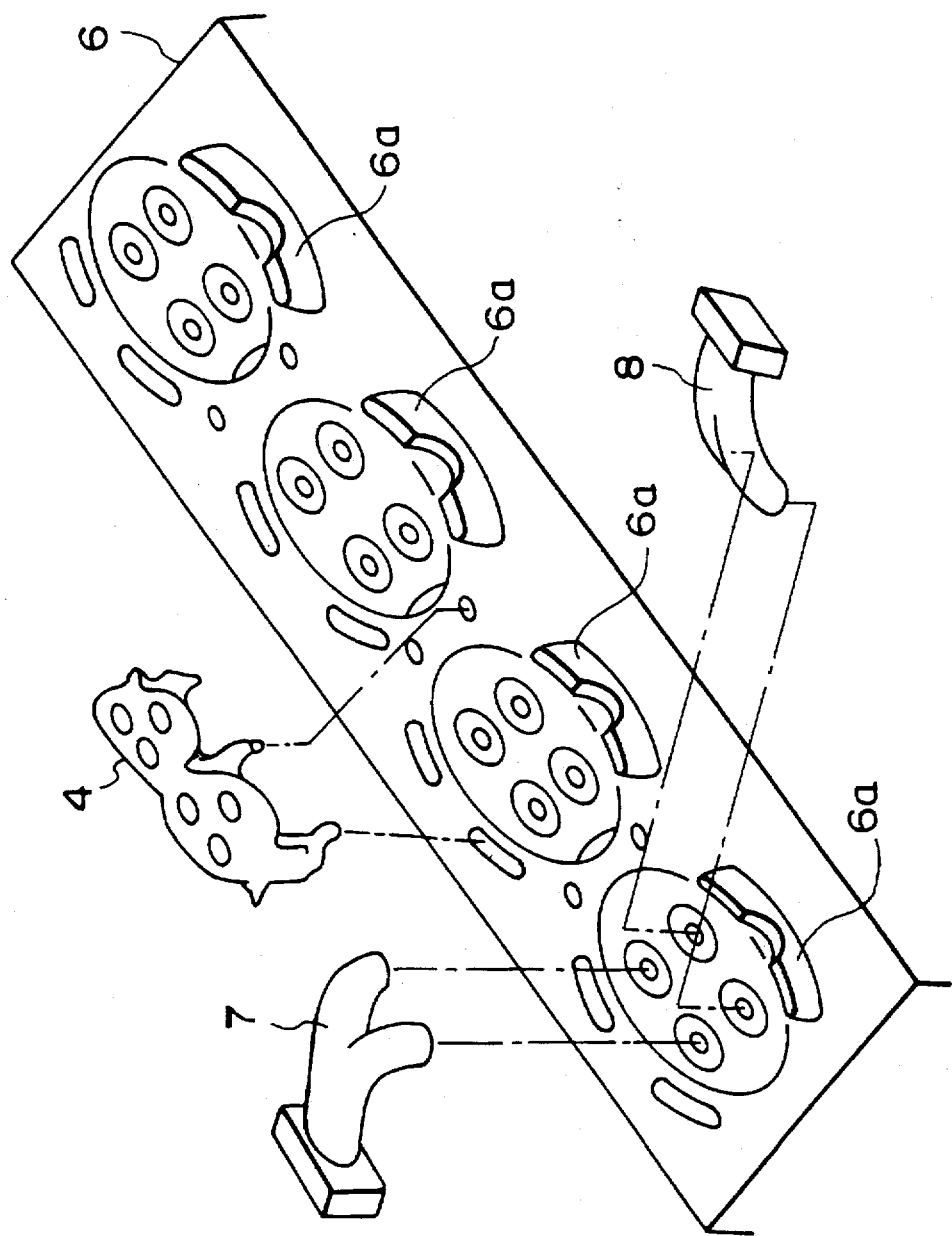
FIG. 4 is a perspective view of a casting mold which forms an under surface of a cylinder head and of certain sand cores, according to a second embodiment of this invention.

Or, as shown in FIG. 4 which illustrates a second embodiment of this invention, it would also be acceptable to form in advance upwards projecting convex portions 6a upon the under surface main mold 6 which defines the under surface of the cylinder head 1, so that these convex portions 6a form the concave portions 3 during the manufacture of the cylinder head 1 by casting. By forming these convex portions 6a upon the lower surface main mold in this manner, no sand core is required for forming the concave portions 3, and the time period required for manufacture of the cylinder head 1 is reduced. It should be noted that, as shown in this figure, a plurality of cores other than the sand core 4 are used in the manufacture of the cylinder head 1 by casting, such as sand cores 7 for forming the exhaust ports, and other sand cores 8 for forming the intake ports.

Figure 5:
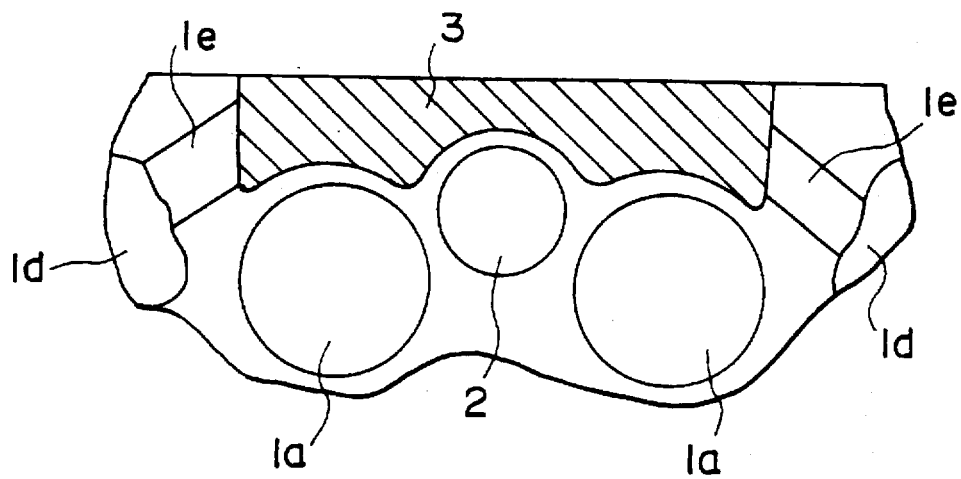
FIG. 5 is a sectional view of a principal portion of a cylinder head according to a third embodiment of this invention, taken along a line approximately perpendicular to the central axis of a fuel injector.

FIG. 5 shows a third embodiment of this invention.

In this embodiment, the concave portions 3 are formed so as generally to conform to the shapes of the intake ports 1a and to the shapes of the hole portions 2 in which the fuel injectors are to be disposed, so as to ensure that the thicknesses of the walls between the concave portions 3, and the intake ports 1a and the hole portions 2, are approximately uniform. Moreover, the figure shows a sectional view of a relevant portion of the cylinder head 1 taken in a sectional plane generally perpendicular to the central axis of one of the hole portions 2, and the upper side of the figure corresponds to the under surface of the cylinder head 1. By doing this, it is possible to arrange for the sectional area of the concave portions 3 to be larger.

Figure 6:
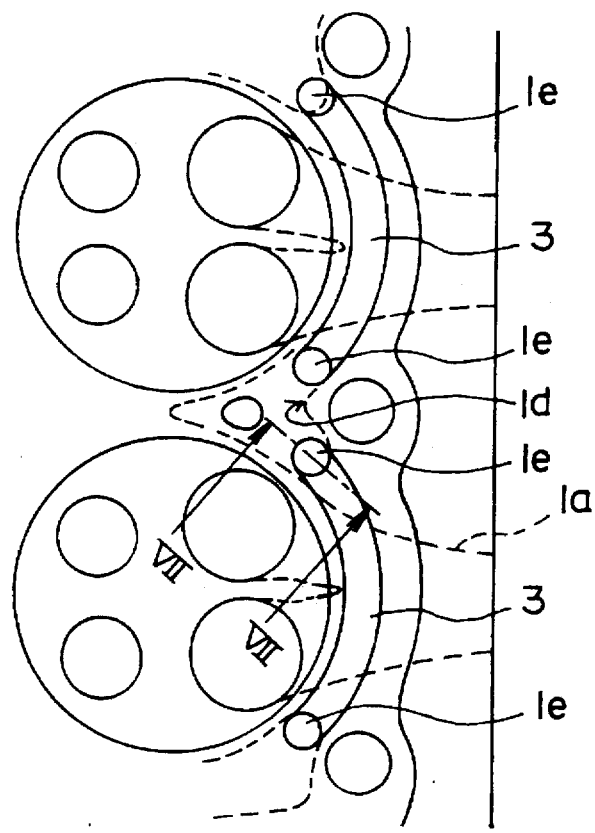
FIG. 6 is a plan view as seen from underneath of a principal portion of an under surface of a cylinder head according to a fourth embodiment of this invention.
Figure 7:
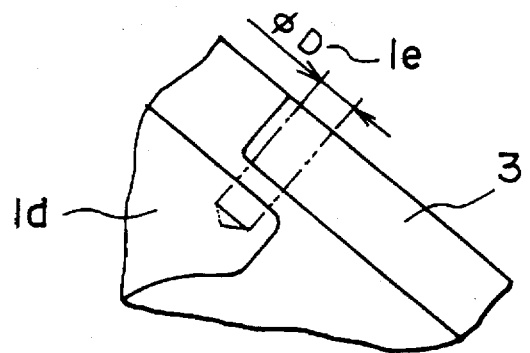
FIG. 7 is a cross-sectional view of a part of the cylinder head, taken along a line VII—VII in FIG. 6.
Figure 8:
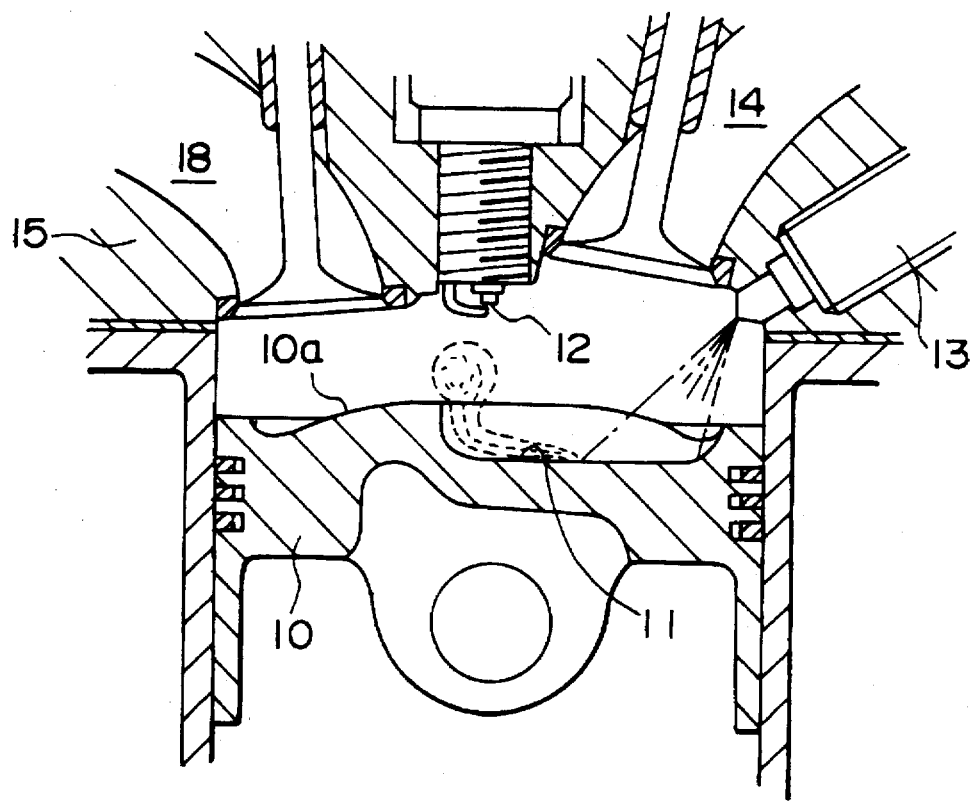
FIG. 8 is a cross-sectional view of a cylinder head according to a prior art.
Figure 9:
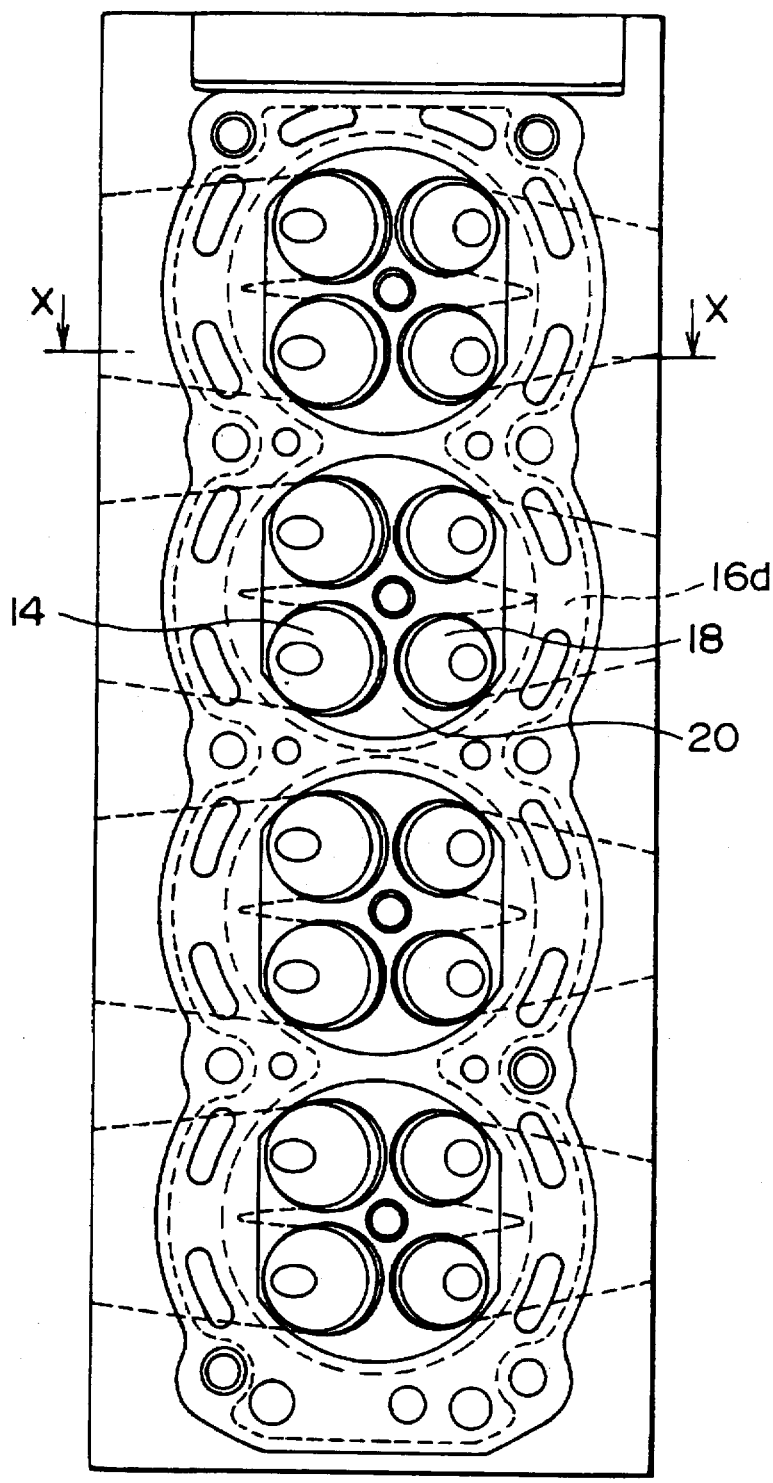
FIG. 9 is a plan view as seen from underneath of the under surface of a cylinder head according to another prior art.
Figure 10:
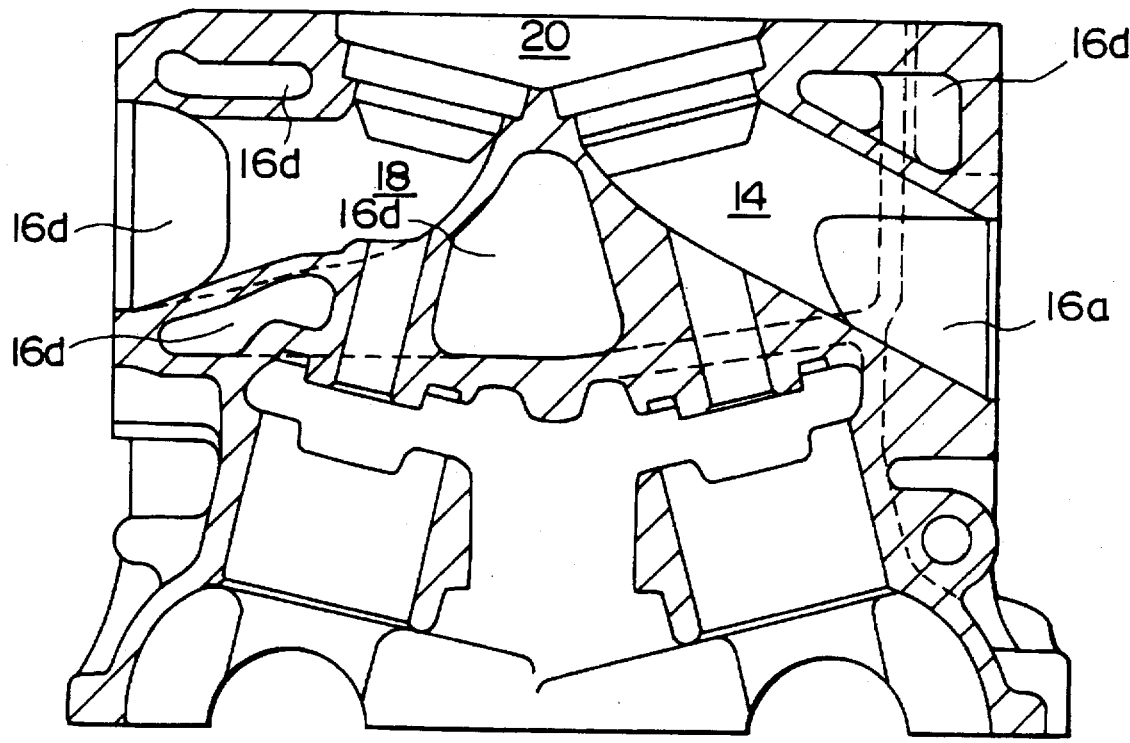
FIG. 10 is a cross-sectional view of the cylinder head, taken along a line X—X in FIG. 9.

FIGS. 6 and 7 show a fourth embodiment of this invention.

Here, the end portions of the coolant conduit 1d which is formed by use of the sand core 4 and the end portions of the concave portions 3 are mutually vertically overlapped. And, as shown in FIG. 7, connecting holes 1e are formed by piercing the cylinder head 1 in the vertical direction with a drill or the like from the concave portions 3 until the coolant conduit 1d is reached.

Since the connecting holes 1e are vertical, just like the holes for the bolts which hold the cylinder head 1 to the cylinder block, therefore it is possible to form these holes all together in one combined operation. Accordingly, in contrast with the hypothetical comparison case in which these connecting holes 1e are formed as sloping, the processing time required for the formation of the connecting holes 1e in the cylinder head 1 is reduced, and likewise the cost of manufacture is minimized.

The above described embodiments were ones which related to cylinder heads for engines in which spark plugs were provided as located in the centers of the cylinders and fuel injectors were provided as located below the intake ports, but this invention is also, for example, effective for cylinder heads for engines in which fuel injectors are provided as located in the centers of the cylinders and spark plugs are provided as located below the intake ports.

The embodiments of this invention in which an exclusive property or privilege is claimed are defined as follows:

1. A cylinder head for a multi-cylinder engine, said cylinder head being manufactured by a casting process and comprising two intake ports and two exhaust ports for each cylinder, said cylinder head further comprising:

a coolant conduit which is formed in said cylinder head using a sand core, said coolant conduit being formed so as to avoid the undersides of said intake ports;

a concave portion which is formed in said cylinder head underneath a pair of said intake ports, said concave portion opening to the under surface of said cylinder head;

and a connecting hole which is formed in said cylinder head by a mechanical process so as to communicate said coolant conduit with said concave portion.

2. A cylinder head according to claim 1, wherein said engine comprises a spark plug disposed generally at the center portion of the cylinder which corresponds to said pair of intake ports, and a fuel injector disposed underneath said pair of intake ports.

3. A cylinder head according to claim 2, wherein said cylinder head further comprises a hole for receiving said fuel injector, and said concave portion is formed so that the thicknesses of the walls between said concave portion, and said pair of intake ports and said fuel injector hole, are approximately uniform.

4. A cylinder head according to claim 1, wherein said engine comprises a fuel injector disposed generally at the center portion of the cylinder which corresponds to said pair of intake ports and a spark plug disposed underneath said pair of intake ports.

5. A cylinder head according to claim 4, wherein said cylinder head further comprises a hole for receiving said spark plug, and said concave portion is formed so that the thicknesses of the walls between said concave portion, and said pair of intake ports and said spark plug hole, are approximately uniform.

6. A cylinder head according to claim 1, wherein said concave portion is formed by a mechanical process.

7. A cylinder head according to claim 1, wherein said concave portion is formed during the manufacture by casting of said cylinder head by providing a convex portion at a portion of a casting mold which corresponds to the under surface of said cylinder head.

8. A cylinder head according to claim 1, wherein a portion of said coolant conduit and a portion of said concave portion are overlapped in the vertical direction, and said connecting hole is formed extending in the vertical direction so as to communicate said overlapped portions.

* * * * *